(12) United States Patent
Zhao et al.

(10) Patent No.: US 9,073,776 B2
(45) Date of Patent: Jul. 7, 2015

(54) DEVICE FOR CONTINUOUSLY PROCESSING VACUUM GLASS MEMBER

(75) Inventors: Yan Zhao, Henan (CN); Yanbing Li, Henan (CN)

(73) Assignee: Luoyang Landglass Technology Co., LTD, Henan (CN)

( * ) Notice: Subject to any disclaimer, the term of this patent is extended or adjusted under 35 U.S.C. 154(b) by 69 days.

(21) Appl. No.: 13/980,912

(22) PCT Filed: Jul. 19, 2011

(86) PCT No.: PCT/CN2011/077321
§ 371 (c)(1),
(2), (4) Date: Jul. 22, 2013

(87) PCT Pub. No.: WO2012/103741
PCT Pub. Date: Aug. 9, 2012

(65) Prior Publication Data
US 2013/0291599 A1    Nov. 7, 2013

(30) Foreign Application Priority Data

Jan. 31, 2011  (CN) .......................... 2011 1 0034717
Jan. 31, 2011  (CN) .......................... 2011 1 0034719

(51) Int. Cl.
| C03B 23/24 | (2006.01) |
| E06B 3/677 | (2006.01) |
| E06B 3/66  | (2006.01) |
| E06B 3/673 | (2006.01) |

(52) U.S. Cl.
CPC ............. *C03B 23/245* (2013.01); *E06B 3/6612* (2013.01); *E06B 3/67369* (2013.01); *E06B 3/6775* (2013.01)

(58) Field of Classification Search
USPC .................................. 65/152, 154, 34, 114
See application file for complete search history.

(56) References Cited

U.S. PATENT DOCUMENTS

| 3,870,499 A | 3/1975 | Stehl |
| 4,368,065 A * | 1/1983 | Frank .............................. 65/114 |

(Continued)

FOREIGN PATENT DOCUMENTS

| CN | 1907895 A | 2/2007 |
| CN | 201068428 Y | 6/2008 |

*Primary Examiner* — Mark Halpern
(74) *Attorney, Agent, or Firm* — AKC Patents LLC; Aliki K. Collins

(57) ABSTRACT

The present invention discloses a device for continuously processing vacuum glass member. The device comprises a loading table, front-end auxiliary vacuum chambers, a main vacuum chamber, a back-end auxiliary vacuum chambers and a unloading table sequentially along the advancing direction of the glass; the device also comprises a glass plate conveying mechanism and an electric control system; the glass plate conveying mechanism is used for conveying glass plates in the processing device; the vacuum chambers are independent from one another and are provided with a vacuum obtaining system and a vacuum detection device respectively, the vacuum degrees of the front-end auxiliary vacuum chambers and the back-end auxiliary vacuum chambers are equal to or lower than the vacuum degree of the main vacuum chamber, and the two auxiliary vacuum chambers provide a transition vacuum space at the front and rear ends of the main vacuum chamber respectively; a plate combining device and a sealing device are arranged in the main vacuum chamber, the two devices can perform plate combining and sealing operations on the glass plates in the main vacuum chamber; and the electric control system is used for performing the system control for a vacuum sealing process and an equipment operation flow.

17 Claims, 6 Drawing Sheets

(56) References Cited

U.S. PATENT DOCUMENTS

| | | | |
|---|---|---|---|
| 4,430,111 A * | 2/1984 | Claassen et al. ................ 65/114 |
| 5,653,838 A | 8/1997 | Hwang et al. |
| 2006/0049126 A1 * | 3/2006 | Hattendorf .................... 212/326 |
| 2009/0151853 A1 * | 6/2009 | Cooper ......................... 156/104 |

* cited by examiner 44    43

44    43    44

DEVICE FOR CONTINUOUSLY PROCESSING VACUUM GLASS MEMBER

TECHNICAL FIELD

This application is a 371 of PCT/CN11/77321 filed 19 Jul. 2011

The present invention relates to a device capable of continuously processing a vacuum glass member.

BACKGROUND ARTS

The vacuum glass member compounded by using two or more glass plates absorbs more and more attention of people due to its excellent sound insulation and heat insulation performances, so various vacuum glass manufacturing methods and corresponding vacuum glass products are provided successively. The structure of the early vacuum glass invented by the applicant is shown in FIGS. 1-3. In the figures, 14a refers to an upper glass plate, 14b refers to a lower glass plate, 14c refers to a middle support and 14d refers to a sealing object. The middle support 14c is preset on the lower glass plate 14b; and the sealing object 14d can be formed by mutually and directly welding metal layers preset on the upper and lower glass plates, can be made of low melting-point glass powder, can also be formed by welding a metal sealing sheet with U-shaped section and the metal layers preset on the upper and lower glass plates, and can be made of all substances capable of sealing the upper and lower glass plates by heating. At present, when the vacuum glass member is manufactured, the method for obtaining vacuum mainly comprises two modes: in the first mode, a bleeder hole 14e is preformed on the glass plate, the inner space of the vacuum glass is vacuumized through the bleeder hole after hermetic seal on the periphery of the vacuum glass member is completed, and the bleeder hole is closed after the predetermined vacuum degree is achieved so as to complete the manufacture of the vacuum glass member; and in the other mode, firstly, the glass plates for forming the vacuum glass member are assembled together, then the assembled glass plates are conveyed into a vacuum chamber for vacuum extraction, and the glass plates assembled together are sealed in the vacuum chamber after the vacuum degree in the vacuum chamber reaches a predetermined value so as to complete the manufacture of the vacuum glass member.

For the above two manufacturing modes for the vacuum glass member, because the distance between the assembled adjacent glass plates is small, even dozens of microns in some case, when the narrow space is vacuumized, the required time is long, and high vacuum degree is difficult to obtain. The two modes cannot realize continuous production. Therefore, a device capable of continuously processing the vacuum glass member with high vacuum degree is badly in need.

INVENTION CONTENTS

The present invention provides a device for continuously processing a vacuum glass member. The device sequentially comprises a loading table, a front-end auxiliary vacuum chamber, a main vacuum chamber, a back-end auxiliary vacuum chamber and an unloading table along the advancing direction of the glass. The device also comprises a glass plate conveying device and an electric control system. The glass plates on the loading table are sequentially conveyed to the front-end auxiliary vacuum chamber, the main vacuum chamber, the back-end auxiliary vacuum chamber and the unloading table through the conveying device. The electric control system is used for controlling a vacuum sealing process and an equipment operation flow. The vacuum chambers are independent from one another and are respectively provided with a vacuum obtaining system and a vacuum detection device, the vacuum degrees of the front-end auxiliary vacuum chamber and the back-end auxiliary vacuum chamber are equal to or lower than the vacuum degree of the main vacuum chamber, and the two auxiliary vacuum chambers are used for providing a transition vacuum space at the front and rear ends of the main vacuum chamber respectively; a plate combining device and a sealing device are arranged in the main vacuum chamber, the two devices can perform plate combining and sealing operations on the glass plates in the main vacuum chamber, and the input and output ends of the plate combining device are connected with the glass plate conveying devices positioned on the upstream and the downstream of the plate combining device respectively; the vacuum degree of the main vacuum chamber is $1\sim5\times10^{-3}$ Pa; and both the front-end auxiliary vacuum chamber and the back-end auxiliary vacuum chamber have a modularized structure, the front and rear ends of the main vacuum chamber can be equipped with one or more auxiliary vacuum chambers as required respectively, and when the plurality of front-end auxiliary vacuum chambers and the plurality of back-end auxiliary vacuum chambers are deployed, the vacuum degrees of the front-end auxiliary vacuum chambers are gradually improved as close to the main vacuum chamber, and the vacuum degrees of the back-end auxiliary vacuum chambers are gradually reduced as away from the main vacuum chamber.

Further, along the advancing direction of the glass plates, each vacuum chamber is air-tightly isolated with the connected upstream station and downstream station through an openable isolation door.

Further, the processing device also comprises cleaning equipment, and the cleaning equipment is arranged in the front-end auxiliary vacuum chamber.

Further, the plate combining device comprises at least two glass plate conveying mechanisms, and the plate combining device automatically assembles together the glass plates conveyed by the conveying mechanisms in a mode that the conveyed glass plate conveyed by one conveying mechanism is automatically stacked on the glass plate conveyed by the other conveying mechanism.

Further, the conveying mechanism is a roller table conveying mechanism or a belt type conveying mechanism, wherein the roller table conveying mechanism consists of a plurality of glass plate conveying rollers parallel to one another and arranged at intervals, and the belt type conveying mechanism consists of supporting rollers and a conveyor belt wound on the supporting rollers.

Further, the glass plate conveying mechanisms are mutually arranged up and down at intervals, the glass plate conveying directions of the glass plate conveying mechanisms are consistent with each other, the glass plates conveyed by each upper conveying mechanism are finally stacked on each bottom conveying mechanism so as to be automatically and mutually assembled together.

Further, the glass plates conveyed by each upper conveying mechanism is stacked on each bottom conveying mechanism in an order, namely the order from top to bottom, the glass plate conveyed by the conveying mechanism of the first layer is stacked on the glass plate conveyed by the conveying mechanism of the second layer, the glass plates stacked together are stacked, from the conveying mechanism of the second layer, on the glass plate conveyed by the conveying mechanism of the third layer, and the processes are repeated till all the glass plates are stacked on the bottom conveying mechanism.

Further, the glass plates conveyed by each upper conveying mechanism are stacked on the bottom conveying mechanism in an order, namely the order from bottom to top, firstly, the glass plate conveyed by the conveying mechanism of the second layer is stacked on the bottom (the first layer) conveying mechanism or the glass plate conveyed by the bottom (the first layer) conveying mechanism, then the glass plate conveyed by the conveying mechanism of the third layer is stacked on the glass plate previously stacked on the bottom (the first layer) conveying mechanism, and the processes are repeated till all the glass plates conveyed by the conveying mechanisms are stacked on the bottom (the first layer) conveying mechanism.

Further, in the glass plate conveying mechanisms, the glass plates conveyed by the conveying mechanisms above the bottom conveying mechanism are simultaneously stacked on the bottom conveying mechanism or the glass plate conveyed by the bottom conveying mechanism in a state of keeping the relationship of the upper and lower plates unchanged, and the glass plates are mutually assembled together.

Further, in the glass plate conveying mechanisms, a glass plate conveying surface at the tail part of the conveying mechanism for conveying the glass plate to the other conveying mechanism is arranged obliquely, and is gradually close to the glass plate conveying surface on the conveying mechanism for bearing the conveyed glass plate along the advancing direction of the glass plate.

Further, the glass plate conveying mechanism is also provided with a glass plate guiding device, and the guiding device limits the position of the glass plate conveyed by the conveying mechanism in the direction vertical to the advancing direction of the glass plate.

Further, in the glass plate conveying mechanisms, the conveying mechanism for receiving the glass plate conveyed by the other conveying mechanism is also provided with a glass plate positioning device or adjusting device, the transverse position and the longitudinal position of the glass plate are limited through the positioning device, or the transverse position and the longitudinal position of the glass plate are adjusted through the adjusting device, so that mutual assembly precision of the glass plates can be ensured.

Further, the plate combining device comprises a trolley with a supporting device and a supporting roller table, the trolley is movably arranged on the supporting roller table, the lower glass plate in the vacuum glass member is placed on a bottom plate of the trolley, the upper glass plate is arranged above the lower glass plate through the supporting device, the upper and lower glass plates are mutually parallel without contact in any form, or one end of the upper glass plate is supported on the same side end of the lower glass plate and locally contacted with the lower glass plate, and the upper and lower glass plates have enough spacing distance or enough included angle, so that the vacuum degree around the upper and lower glass plates is as same as the vacuum degree of the main vacuum chamber; and when plate combination is needed, the upper glass plate is placed on the lower glass plate through the supporting device so as to complete combining operation.

Further, the plate combining device comprises a trolley with a supporting device and a supporting roller table, the trolley is movably arranged on the supporting roller table, each glass plate in the vacuum glass member is arranged on the trolley in a standing mode, the middle part or the end part of each glass plate leans on the supporting device, the adjacent glass plates are mutually parallel or locally contacted, and the adjacent glass plates have enough spacing distance or enough included angle, so that the vacuum degree around the glass plates is as same as the vacuum degree of the main vacuum chamber; and combining operation of each plate can be realized by operating the supporting device leaned by each glass plate.

Further, the sealing device is an inductive heating head, and the inductive heating head is moved through an operating mechanism to complete sealing operation of the vacuum glass member.

Further, the sealing device is a slit type vacuum glass sealing device, the slit type vacuum glass sealing device is provided with a slit through which the glass member to be sealed passes, an inductive heating coil is arranged around the slit, and sealing is completed when the glass member to be sealed passes through the slit; and a compaction roller or a compaction wheel is arranged in the slit, and the glass member to be sealed passes through the slit in a mutual compaction state by using the compaction roller or the compaction wheel to ensure that the glass member to be sealed is reliably sealed.

Further, the sealing device is a laser heating device arranged at the exterior of the main vacuum chamber, the shell of the main vacuum chamber is provided with a transparent window, and the laser heating device seals the plate combining assembled glass member in the main vacuum chamber through the transparent window.

The device disclosed in the present invention for continuously processing the vacuum glass member mainly has the following advantages that:

1. By using the device for processing the vacuum glass member according to the present invention, the whole sealing process of the vacuum glass is performed at normal temperature, so annealing influence caused by high-temperature exhaust and fusion welding on the toughened glass can be avoided.

2. The device is applicable for sealing the vacuum glass plates of various forms.

3. The auxiliary vacuum chambers are arranged in front and back of the main vacuum chamber, and a step-shaped vacuum transition area is arranged between the main vacuum chamber and the outside atmosphere, so the main vacuum chamber can keep high vacuum degree all the time during working, the production efficiency is improved, and the production cost is reduced.

4. The auxiliary vacuum chambers and the main vacuum chamber are independent from one another, and each vacuum chamber has a modularized structure, so the number of the auxiliary vacuum chambers can be set according to the requirement of production quantity.

5. Before the glass plates for forming the vacuum glass member are combined, the surface vacuum degree of each substrate of the glass is as same as the vacuum degree of the vacuum chamber so that the high vacuum degree of the plate combined vacuum glass member is ensured.

6. The internal space of the vacuum chamber is made according to the maximum size of the to-be-produced vacuum glass member, and when the vacuum glass member with smaller size is produced, the loading rate of the production line can be maximized by reasonable glass plate arrangement, so the production efficiency of the vacuum glass member is ensured, and the production and operation costs are reduced.

DETAILED DESCRIPTION

Figure 1:
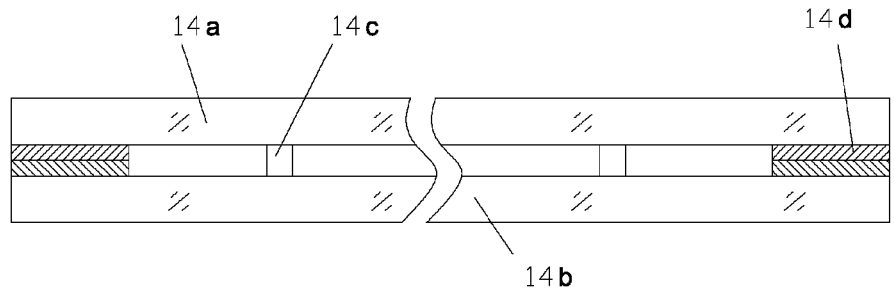
FIG. 1 is a schematic figure of a vacuum glass in a first structural form.
Figure 2:
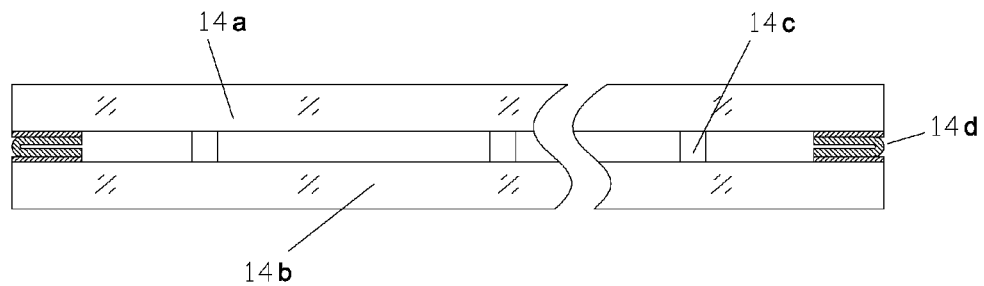
FIG. 2 is a schematic figure of a vacuum glass in a second structural form.
Figure 3:
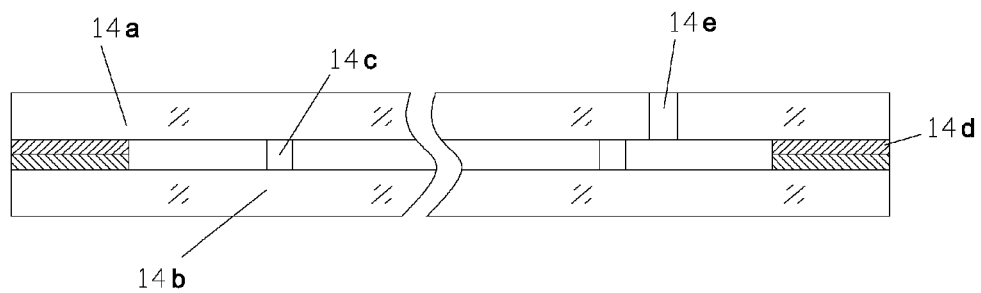
FIG. 3 is a schematic figure of a vacuum glass in a third structural form.
Figure 4:
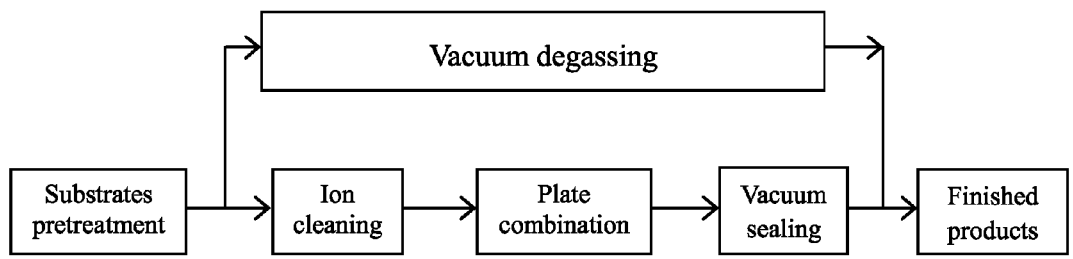
FIG. 4 is a processing process flow figure of a continuous vacuum glass member.

Shown as the FIG. 4, the process for continuously processing vacuum glass member generally comprises the steps of glass plate pretreatment, glass plate ion cleaning, plate combination, vacuum sealing and the like. In the invention, the glass plate pretreatment comprises the steps of: presetting a sealing material at the sealed positions of the upper and lower glass substrates, and placing a support on the lower substrate and the like, wherein the preset sealing material can be: 1, a low melting-point glass powder sealing material; 2, metal layers consolidated with the glass plates together, wherein at least one metal layer of the two glass plates is pre-plated with a solder or fixed with a solder foil strip; and 3, metal sealing strips previously fixed on the surfaces of the two glass plates, wherein the metal sealing strips extend out of the glass plates; therefore, after the two glass plates are mutually assembled together, sealing process for the glass plates can be carried out through the sealing device.

Figure 5:
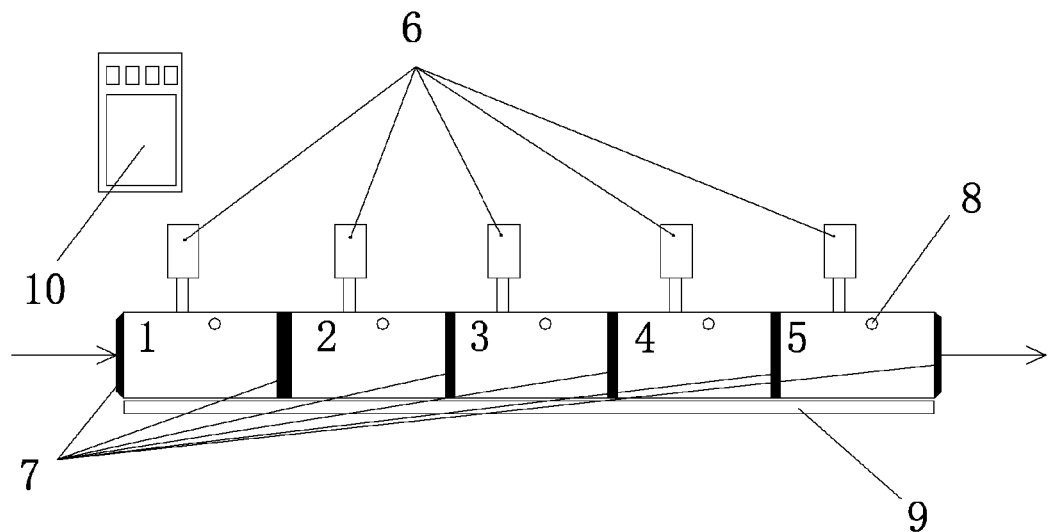
FIG. 5 is a structural schematic figure of a continuous glass member sealing device in the invention.

Shown as the FIG. 5, the specified device for continuously processing vacuum glass member according to the present invention can perform the processes of ion cleaning, combined plate pairing, vacuum degassing, vacuum sealing, plate discharge and the like on the pretreated glass plates. The device mainly comprises the following parts: a loading table (not shown in the figure), an inlet buffer chamber 1, a vacuum pre-extracting chamber 2, a main vacuum chamber 3, an inflating transition chamber 4, an outlet buffer chamber 5, an unloading table (not shown in the figure), a glass plate conveying device 9 and an electric control system 10 arranged sequentially along the advancing direction of the glass. The inlet buffer chamber 1 and the vacuum pre-extracting chamber 2 are front-end auxiliary vacuum chambers, the inflating transition chamber 4 and the outlet buffer chamber 5 are back-end auxiliary vacuum chambers, each auxiliary vacuum chamber has a modularized structure, and the number of the auxiliary vacuum chambers can be arranged randomly at the front and rear ends of the main vacuum chamber 3 as required.

The inlet ends and the outlet ends of the auxiliary vacuum chambers and the main vacuum chamber 3 are provided with vacuum door locks 7; and the auxiliary vacuum chambers and the main vacuum chamber are provided with a vacuum obtaining system 6 and a vacuum detection device 8 respectively. When the vacuum door locks 7 are closed, the vacuum chambers can be closed and isolated so that the vacuum chambers keep independent vacuum degree. The vacuum obtaining system 6 of each chamber can provide independent vacuum for each chamber. The vacuum detection device 8 is used for detecting the vacuum degree of each chamber. The glass plate conveying device 9 is used for conveying materials such as the glass member between the chambers, and can adopt various structures capable of transferring flat objects in the existing technology, for example, a roller table structure or a belt transmission structure and the like. The electric control system 10 is used for performing the system control for the whole vacuum sealing process and each equipment operation flow.

The auxiliary vacuum chambers play a main role in providing a vacuum buffer space with certain vacuum degree at the front and rear ends of the main vacuum chamber 3, and the vacuum degree in each auxiliary vacuum chamber is not greater than that of the main vacuum chamber 3; and if the two ends of the main vacuum chamber are provided with two or more auxiliary vacuum chambers, the vacuum degrees of the front-end auxiliary vacuum chambers are gradually improved as close to the main vacuum chamber 3, and the vacuum degrees of the back-end auxiliary vacuum chambers are gradually reduced as away from the main vacuum chamber 3.

Taking the continuous vacuum glass member processing device in the FIG. 5 for example, the glass plate first enters the inlet buffer chamber 1, and then the inlet buffer chamber 1 is vacuumized so that the vacuum degree of the inlet buffer chamber 1 reaches the vacuum degree of the vacuum pre-extracting chamber 2; then the vacuum door lock 7 between the inlet buffer chamber 1 and the vacuum pre-extracting chamber 2 is opened, the glass plate enters the vacuum pre-extracting chamber 2, and the vacuum door lock 7 between the inlet buffer chamber 1 and the vacuum pre-extracting chamber 2 is closed; and the vacuum pre-extracting chamber 2 is vaccumized so that the vacuum degree of the vacuum pre-extracting chamber 2 reaches the vacuum degree of the main vacuum chamber 3. The vacuum door lock 7 between the vacuum pre-extracting chamber 2 and the main vacuum chamber 3 is opened, and the glass plate enters the main vacuum chamber. The glass plates are processed into the vacuum glass member in the main vacuum chamber 3. The vacuum degree in the inflating transition chamber 4 is improved to be as same as that in the main vacuum chamber 3, the vacuum door lock 7 between the inflating transition chamber 4 and the main vacuum chamber 3 is opened, the vacuum glass member enters the inflating transition chamber 4 from the main vacuum chamber, then the vacuum door lock 7 is closed, and the inflating transition chamber 4 is reduced to the predetermined vacuum degree; and meanwhile, the vacuum degree of the outlet buffer chamber 5 is improved to be as same as that of the inflating transition chamber 4, the vacuum door lock 7 between the outlet buffer chamber 5 and the inflating transition chamber 4 is opened, the vacuum glass member enters the outlet buffer chamber 5, then the vacuum door lock 7 between the transition chamber 4 and the buffer chamber 5 is closed, the buffer chamber 5 is reduced to normal pressure, the vacuum door lock of the buffer chamber 5 is opened, and the vacuum glass member is conveyed to the unloading table and enters the next process through the unloading table.

Ion cleaning equipment is arranged in the vacuum pre-extracting chamber 2, and residual gas molecules and water molecules on the surfaces of the glass plates are removed through the ion cleaning equipment during working.

A plate combining device and a sealing device are arranged in the main vacuum chamber 3, and in addition, the sealing device can also be arranged inside or outside the main vacuum chamber 3 according to different selected types.

The vacuum degree in the main vacuum chamber 3 is $1\sim5\times10^{-3}$ Pa or higher.

Figure 6:
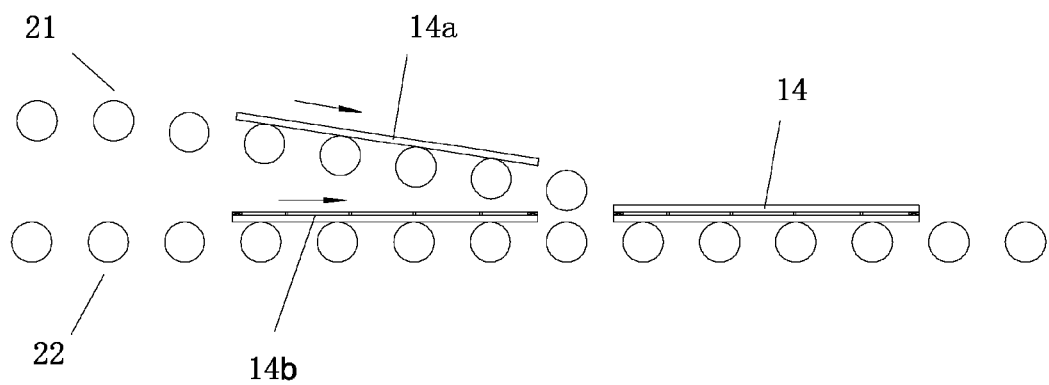
FIG. 6 is a structural schematic figure of a first plate combining device in the invention.

The plate combining device of the first structural form used in the continuous vacuum glass member processing device of the present invention is shown in the FIG. 6. The glass plate combining device consists of two glass plate conveying mechanisms, and the upper conveying mechanism 21 and the lower conveying mechanism 22 are mutually arranged up and down at intervals, wherein the upper conveying mechanism 21 is used for conveying an upper glass plate 14a in the glass member 14 with the two-layer structure, and the lower conveying mechanism 22 is used for conveying a lower glass plate 14b. The upper and lower conveying mechanisms 21 and 22 adopt roller table conveying mechanism, and each conveying mechanism consists of a plurality of glass plate conveying rollers parallel to one another. The conveyed surface of the lower glass plate 14b of the lower conveying mechanism 22 is arranged horizontally; and in order that the upper glass plate 14a can be stably and smoothly stacked on the lower glass plate 14b, the glass plate conveying surface at the tail part of the upper conveying mechanism 21 is arranged obliquely downwards and is gradually close to the glass plate conveying surface of the lower conveying mechanism 22.

Taking the plate combining operation of the glass member with the two-layer structure as example, when the plate combining device works, the upper conveying mechanism 21 and the lower conveying mechanism 22 receive the upper and lower glass plates 14a and 14b conveyed from the exterior respectively, and the two glass plates are conveyed to the downstream respectively, wherein after the upper glass plate 14a leaves the tail end of the upper conveying mechanism 21, the upper glass plate 14a automatically falls on the lower glass plate 14b conveyed by the lower conveying mechanism 22 and is automatically and mutually assembled with the lower glass plate 14b together, and the plate combining operation of the upper and lower glass plates 14a and 14b is completed.

In order that the upper glass plate 14a falls on the lower glass plate 14b according to the predetermined position to ensure the relative positions of the assembled glass plates, the positions of the upper and lower glass plates 14a and 14b need to be controlled before combining, which includes the following specific control modes of:

(1) Controlling the transverse positions (namely positions in the directions vertical to the advancing directions of the glass plates) of the upper and lower glass plates 14a and 14b when being conveyed to the upper and lower conveying mechanisms 21 and 22 so that the transverse positions of the two glass plates are matched, and controlling initial longitudinal positions (namely positions along the advancing directions of the glass plates) of the upper and lower glass plates 14a and 14b when being conveyed to the respective conveying mechanisms according to the conveying speeds of the upper and lower conveying mechanisms 21 and 22 so that the upper glass plate 14a leaving the tail end of the upper conveying mechanism 21 just falls on the lower glass plate 14b according to the predetermined relative longitudinal position;

(2) Arranging guiding devices on the upper and lower conveying mechanisms 21 and 22, limiting the upper and lower glass plates 14a and 14b at the transverse positions vertical to the advancing directions of the glass plates by using the guiding devices so that the two glass plates are mutually assembled in a state of keeping the transverse positions matched, arranging a longitudinal positioning device on the lower conveying mechanism 22, and detaining the advancing lower glass plate 14b at the proper position by using the positioning device to bear the upper glass plate 14a falling from the upper conveying mechanism 21 so that the upper glass plate 14a is mutually assembled with the lower glass plate 14b according to the predetermined relative longitudinal position, wherein the positioning device can be a position sensor or a movable baffle plate upwards extending out of the roller conveying surface or the like;

(3) While ensuring that the upper glass plate 14a reliably falls on the lower glass plate 14b, arranging adjusting devices on the lower conveying mechanism 22, and adjusting the longitudinal and transverse relative positions of the upper and lower glass plates 14a and 14b stacked together through the adjusting devices so that the two glass plates are mutually assembled together according to the predetermined relative positions, wherein the adjusting devices can be two pairs of push plates for adjusting the longitudinal direction and the transverse direction of the glass plates respectively; and the push plates can be driven by a cylinder or a hydraulic cylinder and can also be driven by other proper driving mechanisms.

The three specific control modes for the positions of the glass plates can be adopted separately or used together.

Figure 7:
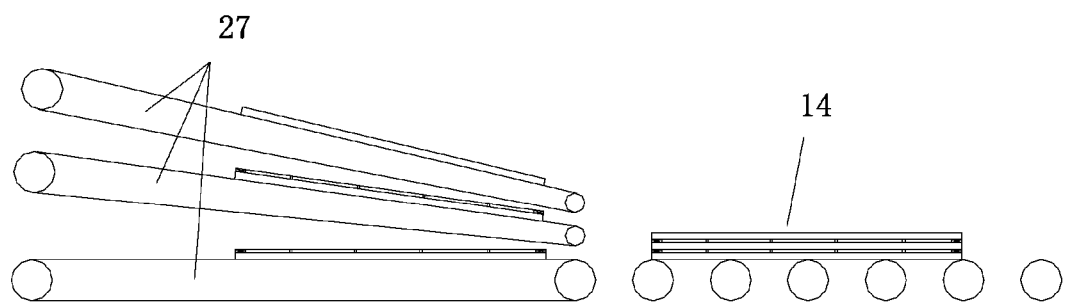
FIG. 7 is a structural schematic figure of a second plate combining device in the invention.

The second plate combining device of the present invention is shown in the FIG. 7. Compared with the first plate combining device, the plate combining device consists of three layers of glass plate conveying mechanisms mutually arranged up and down at intervals, and the glass plate conveying directions of the three layers of conveying mechanisms are consistent with each other, wherein the two layers of conveying mechanisms of the upper part are belt type conveying mechanisms 27, the front half part of the bottom conveying mechanism is a belt type conveying mechanism 27, the rear half part of the bottom conveying mechanism is a roller table conveying mechanism, the glass plate conveying surface of the bottom conveying mechanism is arranged horizontally, and the glass plate conveying surfaces of the two layers of conveying mechanisms of the upper part are arranged obliquely downwards and are gradually close to the glass plate conveying surface of the bottom conveying mechanism along the advancing direction of the glass plate.

During working, the three layers of glass plate conveying mechanisms convey the upper, middle and lower glass plates in the glass member of the multi-layer structure respectively; and after the glass plates conveyed by the two layers of conveying mechanisms of the upper part leave the tail ends of respective conveying mechanisms, the glass plates automatically fall on the glass plate conveyed by the bottom conveying mechanism simultaneously and automatically assembled one another together.

In order to assemble the upper, middle and lower glass plates together according to the predetermined relative position relationship, the positions of the glass plates in the second plate combining device can also be controlled by adopting the control modes described in the first plate combining device.

Figure 8:
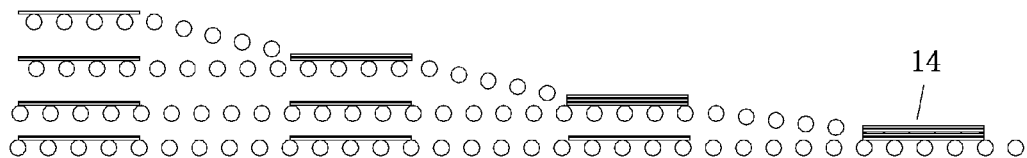
FIG. 8 is a structural schematic figure of a third plate combining device in the invention.

The third plate combining device of the present invention is shown in the FIG. 8. In the plate combining device, four glass plate conveying mechanisms are mutually arranged up and down at intervals, and the glass plate conveying directions of the four conveying mechanisms are consistent with each other so as to form the glass plate combining device of a four-layer structure; the glass plate conveying surface of the bottom conveying mechanism is arranged horizontally, and the glass plate conveying surfaces of the tail parts of the upper three conveying mechanisms are arranged obliquely downwards and are gradually close to the glass plate conveying surface of the lower adjacent conveying mechanism along the advancing direction of the glass plates; and the four conveying mechanisms are roller table conveying mechanisms.

During working, the four conveying mechanisms are used for conveying the glass plates of the corresponding layers in the glass member of the four-layer structure respectively, and the glass plates of all the layers are assembled sequentially from top to bottom: firstly, the glass plate conveyed by the top conveying mechanism automatically falls on the glass plate conveyed by the second conveying mechanism from the top to bottom, and the glass plates are mutually assembled together; then, after leaving the tail end of the second conveying mechanism, the two glass plates stacked together are automatically fall on the glass plate conveyed by the third conveying mechanism; and finally, the three layers glass plates assembled together automatically fall on the glass plate conveyed by the bottom conveying mechanism from the tail end of the third conveying mechanism and are assembled with the glass plate together to finally complete the plate combining operation of the glass member of the four-layer structure.

Figure 9:
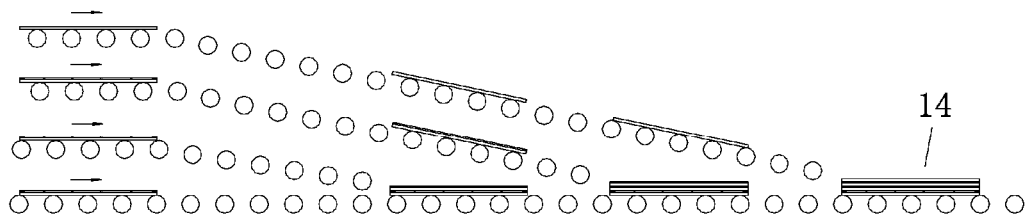
FIG. 9 is a structural schematic figure of a fourth plate combining device in the invention.

The fourth plate combining device of the present invention is shown in the FIG. 9 and is another glass plate combining device of the four-layer structure. Compared with the third plate combining device of the four-layer structure, the fourth plate combining device has the differences that: the glass plates conveyed by the four conveying mechanisms are assembled sequentially from bottom to top, namely the glass plate conveyed by the second conveying mechanism from the bottom to top automatically falls on the glass plate conveyed by the bottom conveying mechanism and is assembled together with the glass plate, then the glass plate conveyed by the third conveying mechanism automatically falls on the assembled two glass plates conveyed by the bottom conveying mechanism, finally the glass plate conveyed by the fourth conveying mechanism automatically falls on the three layers of assembled glass plates conveyed by the bottom conveying mechanism, and mutual assembling of the four glass plates can be completed finally.

Same as the first plate combining device, in order that the glass plates are assembled together according to the predetermined relative position relationship, the control modes described in the first plate combining device can also be adopted in the third and fourth plate combining devices to control the positions of the glass plates. Moreover, the third and fourth plate combining devices also can be constructed by adopting the belt type conveying mechanisms in the second plate combining device.

In addition, it also should be noted that the glass member of the two-layer structure can also be assembled by using the second plate combining device, then the upper two layers of conveying mechanisms are used for conveying the upper and lower glass plates to be assembled respectively, and the bottom conveying mechanism is used for providing support for the assembly of the two glass plates and conveying the assembled glass plates. Likewise, the glass member of the three-layer structure can be assembled by using the fourth plate combining device, and then the bottom conveying mechanism is only used for providing support for the assembly of the glass plates and conveying the assembled glass plates.

The plate combining device can be a part of the glass plate conveying device 9 positioned in the main vacuum chamber, and the glass plate conveying device 9 has the glass plate conveying surfaces of the same layers as the plate combining mechanisms. Or, the glass plate conveying device 9 only has a conveying surface, the conveying surface is the input or output end of the bottom conveying mechanism of each plate combining mechanism, then an operating device such as a manipulator is arranged at the input end of the plate combining mechanism, and a plurality of glass plates conveyed by the glass plate conveying device 9 are transferred to the conveying mechanisms in the plate combining mechanism by using the operating device.

Figure 10:
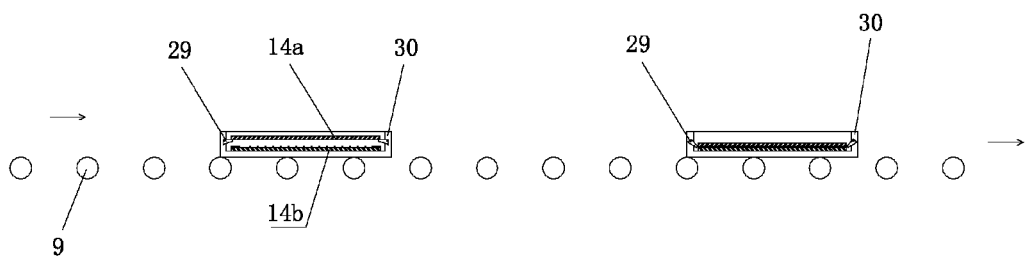
FIG. 10 is a structural schematic figure of a fifth plate combining device in the invention.

The fifth structural form of the plate combining device is shown in the FIG. 10. The plate combining device comprises a trolley 30 and a supporting roller table 32, wherein the trolley 30 is provided with a supporting device 29; the trolley 30 can move on the supporting roller table 32; and the input end and the output end of the supporting roller table 32 are connected with the upstream and downstream glass plate conveying devices 9 respectively.

The supporting device 29 is arranged in the trolley 30 and used for supporting the glass plates. The lower glass plate 14b is placed on the bottom plate of the trolley 30, the upper glass plate 14a is arranged on the supporting device 29, the upper and lower glass plates are mutually parallel, the upper and lower glass plates have enough spacing distance to ensure that the two glass plates have the same vacuum degree as the vacuum chamber, and the distance is preferably not less than 5 millimeters. After the trolley 30 moves to the proper position in the main vacuum chamber 3, the supporting device 29 places the upper glass plate 14a on the lower glass plate 14b to complete plate combining operation.

Figure 11:
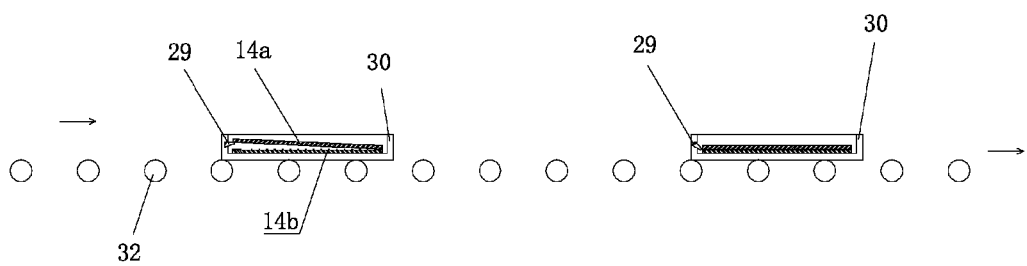
FIG. 11 is a structural schematic figure of a sixth plate combining device in the invention.

The sixth structural form of the plate combining device is shown in the FIG. 11. The plate combining device similarly comprises a trolley 30 and a supporting roller table 32, wherein the trolley 30 is similarly provided with a supporting device 29; the supporting device 29 is arranged in the trolley 30 and used for supporting the glass plates; the trolley 30 can move on the supporting roller table 32; and the input end and the output end of the supporting roller table 32 are connected with the upstream and downstream glass plate conveying devices 9 respectively. The lower glass plate 14b is placed on the bottom plate of the trolley 30, one end of the upper glass plate 14a is supported on the lower glass plate 14b and aligned with the corresponding end of the lower glass plate 14b, the other end of the upper glass plate 14a is arranged on the supporting device 29, the two glass plates are in a V-shape state, and the size at the V-shaped opening should ensure that the two glass plates have a enough included angle so as to ensure that the two glass plates have the same vacuum degree as the vacuum chamber. After the trolley 30 moves to the proper position in the main vacuum chamber 3, the supporting device 29 places the upper glass plate 14a on the lower glass plate 14b to complete plate combining operation.

Figure 12:
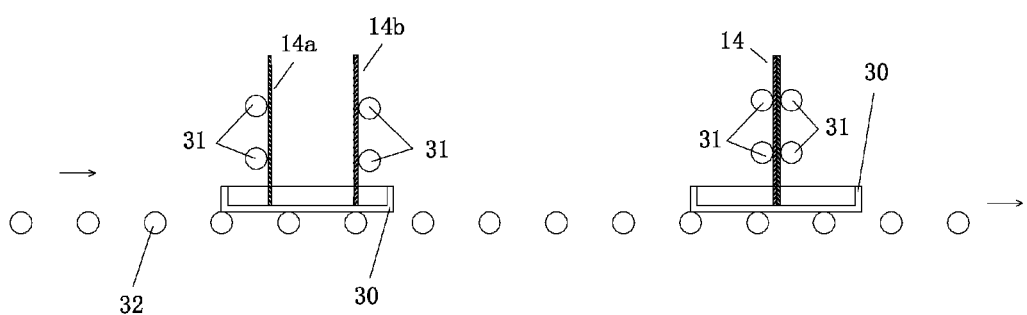
FIG. 12 is a structural schematic figure of a seventh plate combining device in the invention.

The seventh structural form of the plate combining device is shown in the FIG. 12. The plate combining device comprises a trolley 30 and a supporting roller table 32, wherein the trolley 30 is provided with a supporting device 31; the two glass plates 14a and 14b are arranged on the trolley 30 by leaning on the supporting device 31; and as same as the sixth plate combining device, the distance or the included angle between the two glass plates also ensures that the vacuum degree between the two glass plates is as same as that in the vacuum chamber. The plate combining operation between the two glass plates is completed by operating the supporting roller 31 to move. In the plate combining device, because the upper and lower glass plates are arranged on the trolley 30, the relative position between the two glass plates can be ensured without using a position adjusting device.

Before the glass plates are assembled one another, all the plate combining devices can ensure that each glass plate is independently positioned in the vacuum environment, namely ensure that the vacuum degree on the periphery of each glass plate is as same as that in the vacuum chamber, so the vacuum space in the vacuum glass member has totally the same vacuum degree as the vacuum environment (vacuum chamber) during assembly.

Figure 13:
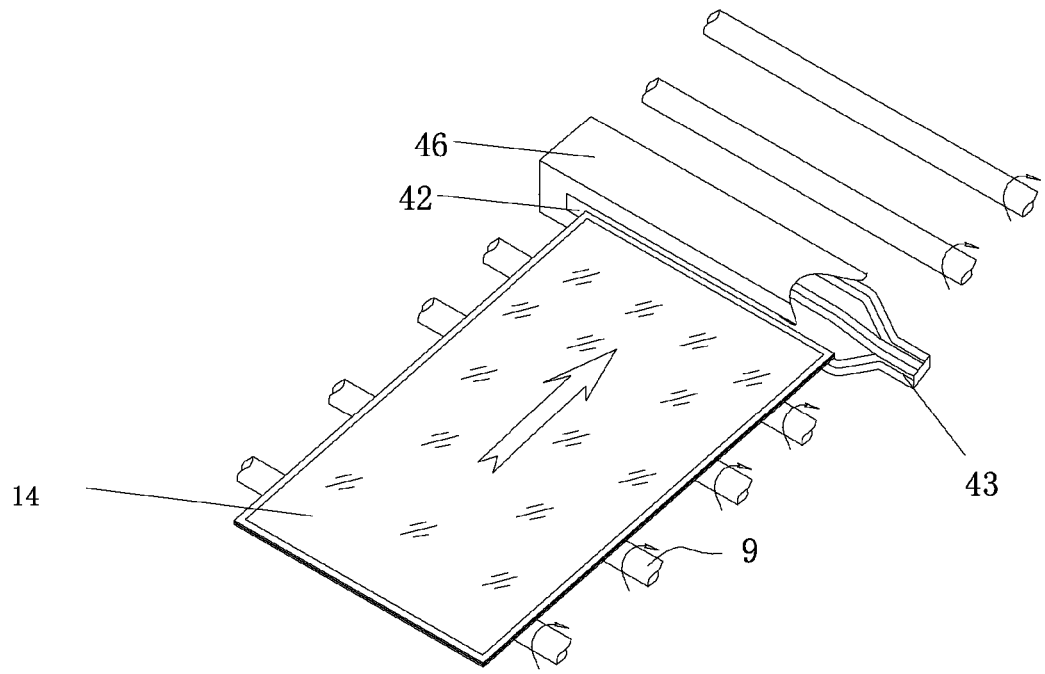
FIG. 13 is a structural schematic figure of a first sealing device in the invention.

A sealing device applied in the present invention is shown in the FIG. 13. The sealing device is a slit type inductive heating device and is integrally strip-shaped, the middle part of the height direction of a shell 46 is provided with a slit 42 extending along the length direction of the shell 46, inductive heating coils 43 are arranged around the slit 42 in the shell 46 according to the conventional mode, and the joint of the inductive heating coils 43 is arranged at one end of the shell.

Figure 14:
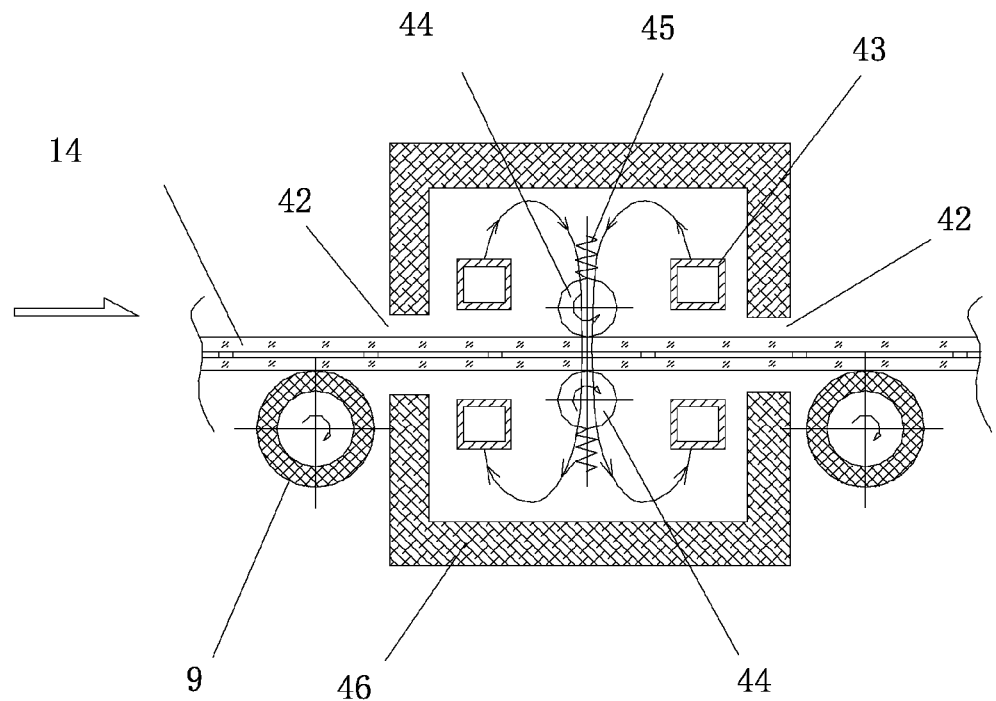
FIG. 14 is a schematic figure of the first setting mode of a compaction roller or a compaction wheel in the sealing device shown in the FIG. 13.

In addition, in order to ensure that the peripheral part to be welded is reliably welded and connected when the vacuum glass member 14 to be sealed passes through the slit 42, under the condition that normal heating of the inductive heating coils 43 on the part to be welded on the vacuum glass member 14 to be sealed is not affected, a glass plate compaction roller or compaction wheel can also be arranged in the slit 42. The FIG. 14 is the schematic figure of the first mode of the compaction roller or the compaction wheel 44 arranged in the slit 42, wherein in the FIG. 14, 46 refers to the shell of the sealing device, 43 refers to the high-frequency inductive heating coils arranged around the slit 42, 44 refers to the compaction roller or the compaction wheel, 45 refers to an ejection spring, and the compaction roller or the compaction wheel 44 is arranged between the high-frequency inductive heating coils 43. During working, when the vacuum glass member 14 to be sealed enters the upper and lower compaction rollers or compaction wheels 44, the two glass plates in the vacuum glass member 14 are mutually compacted so that the glass plates are mutually welded and connected in a compaction state to ensure that the periphery of the two glass plates is reliably and air-tightly sealed.

Figure 15:
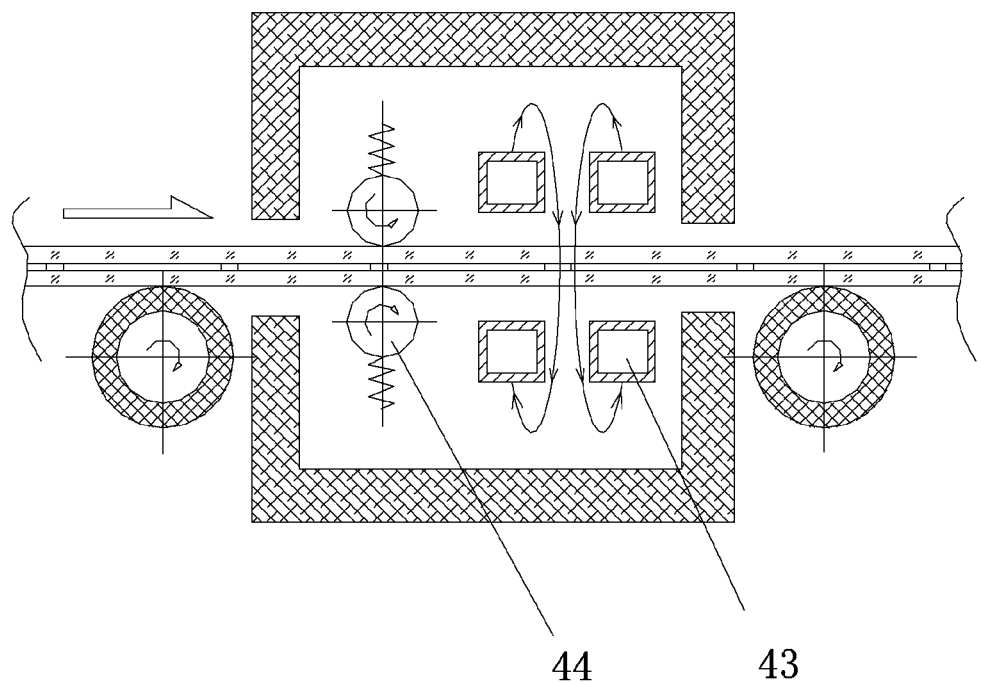
FIG. 15 is a schematic figure of the second setting mode of the compaction roller or the compaction wheel in the slit sealing device shown in the FIG. 13.
Figure 16:
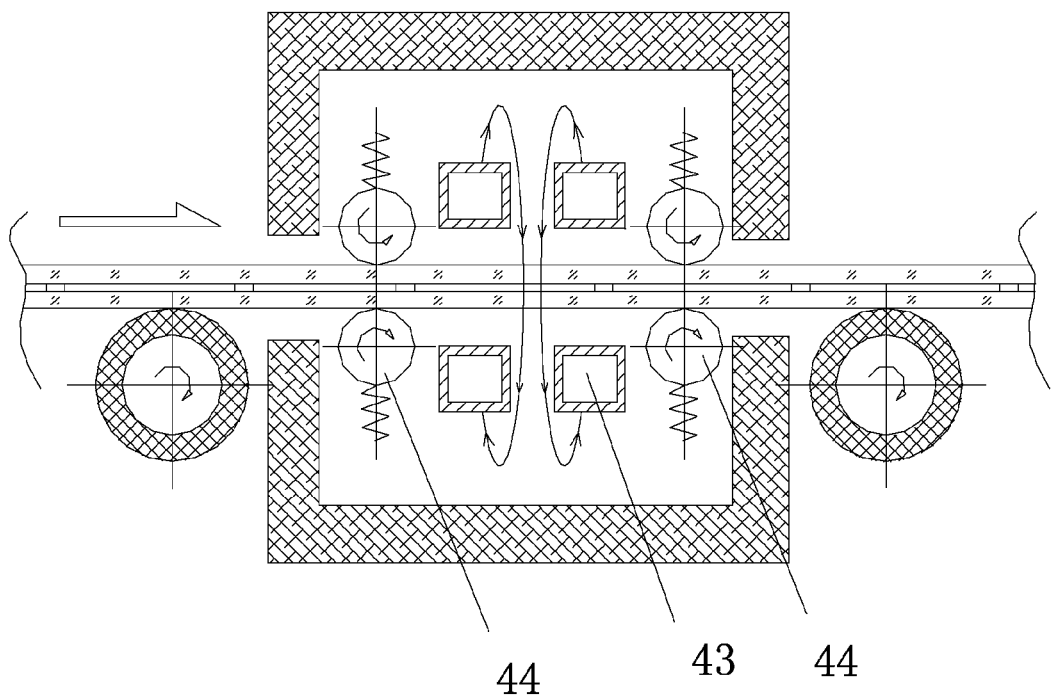
FIG. 16 is a schematic figure of the third setting mode of the compaction roller or the compaction wheel in the slit sealing device shown in the FIG. 13.

Besides the setting form shown in the FIG. 14, the compaction roller or the compaction wheel 44 can be arranged on one side of the inductive heating coils 43 as shown in the FIG. 15, and can also be arranged on two sides of the inductive heating coils 43 as the FIG. 16.

Besides that the slit type inductive heating device is used as the sealing device, a high-frequency inductive head, a laser head and the like can also be used for sealing the vacuum glass member in the invention. The sealing device shown in the FIG. 17 consists of a plurality of heating heads 51 and an operating device thereof, wherein the heating heads 51 can move in a three-dimensional space, and the number of the heating heads 51 can be 1 to 4, generally 2. When the vacuum glass member 14 is sealed by using the heating heads 51, the heating heads 51 can be operated to move along the part to be sealed on the vacuum glass member 14, the heating heads 51 can also be not moved, while the vacuum glass member 14 is operated to move.

Figure 17:
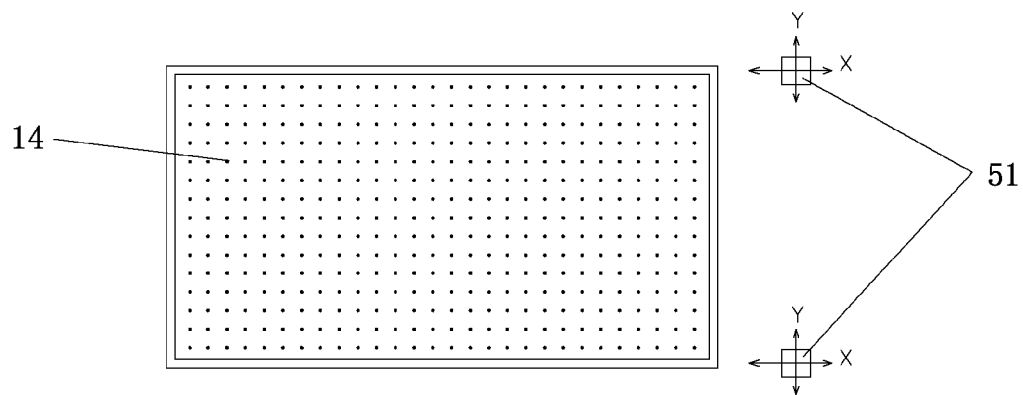
FIG. 17 is a structural schematic figure of a second sealing device in the invention.
Figure 18:
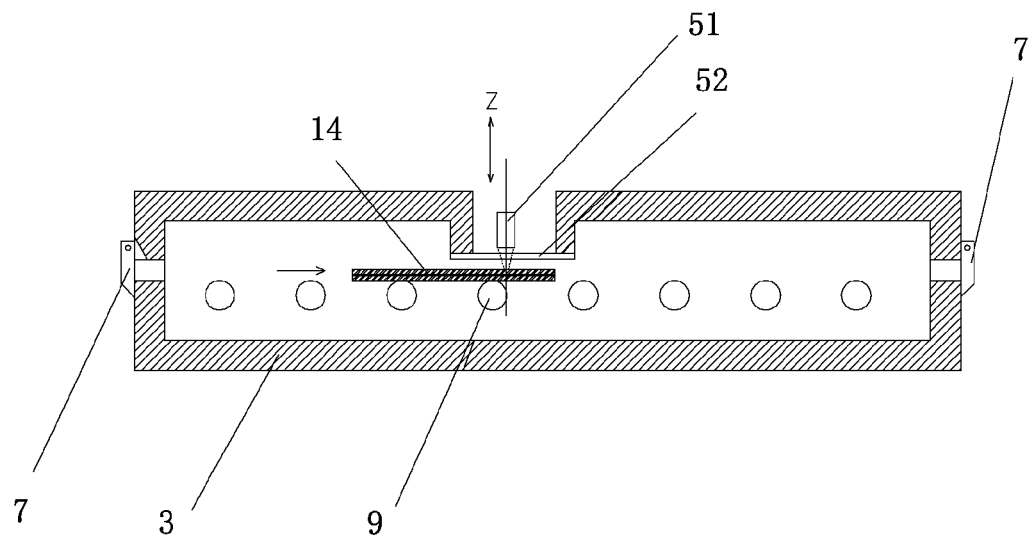
FIG. 18 is a structural schematic figure of a third sealing device in the invention.

The heating heads 51 in the FIG. 17 are arranged in a vacuum chamber. When the laser heads are used as the heating heads 51, shown as the FIG. 18, a transparent window 52 can also be arranged above the top of the main vacuum chamber 3, and the vacuum glass member 14 in the main vacuum chamber 3 is heated and sealed by the heating heads 51 through the window 52.

In order to monitor the processing condition of each step of the vacuum glass member 14 better, one or more industrial cameras for monitoring the whole processing process in real time can also be arranged in the main vacuum chamber 3 and each auxiliary vacuum chamber.

When the continuous processing device according to the present invention works, the vacuum door lock 7 at the inlet end of the inlet buffer chamber 1 is opened, the pretreated glass plates on the loading table enters the inlet buffer chamber 1, then the two vacuum door locks 7 at the inlet end and the outlet end of the inlet buffer chamber 1 are closed, and the inlet buffer chamber 1 is vaccumized by using the vacuum obtaining system; when the vacuum degree in the inlet buffer chamber 1 is as same as the vacuum degree of the vacuum pre-extracting chamber 2, the vacuum door lock 7 between the inlet buffer chamber 1 and the vacuum pre-extracting chamber 2 is opened, the glass plate enters the vacuum pre-extracting chamber 2, then the vacuum door lock 7 between the inlet buffer chamber 1 and the vacuum pre-extracting chamber 2 is closed, the vacuum pre-extracting chamber 2 is vaccumized, and the glass plate is subjected to ion cleaning at the same time to remove gas molecules and water molecules attached to the surface of the glass plate; after the vacuum degree of the vacuum pre-extracting chamber 2 is as same as the vacuum degree of the main vacuum chamber 3, the vacuum door lock 7 between the main vacuum chamber 3 and the vacuum pre-extracting chamber 2 is opened, the glass plate enters the main vacuum chamber 3, then the vacuum door lock 7 between the main vacuum chamber 3 and the vacuum pre-extracting chamber 2 is closed, the vacuum degree in the main vacuum chamber 3 is $1\sim5\times10^{-3}$ Pa, and certainly, the main vacuum chamber can also have higher vacuum degree as required; in the main vacuum chamber 3, the glass plates are combined by using the plate combining device, and then the glass plates are sealed by using the sealing device to manufacture the required vacuum glass member 14; the inflating transition chamber 4 is vaccumized to the same vacuum degree as the main vacuum chamber 3, the vacuum door lock 7 between the main vacuum chamber 3 and the inflating transition chamber 4 is opened, and the vacuum glass member 14 enters the inflating transition chamber 4; the vacuum door lock 7 between the main vacuum chamber and the inflating transition chamber 4 is closed, the vacuum degree of the inflating transition chamber 4 is reduced and as same as the vacuum degree in the outlet buffer chamber 5; the vacuum door lock 7 between the inflating transition chamber 4 and the outlet buffer chamber 5 is opened, the vacuum glass member enters the outlet buffer chamber 5, then the vacuum door lock 7 between the outlet buffer chamber 5 and the inlet buffer chamber 1 is closed, the vacuum degree of the outlet buffer chamber 5 is further reduced to be as same as the atmosphere, then the vacuum door lock 7 of the outlet buffer chamber is opened, and the vacuum glass member 14 is conveyed to the unloading table.

Before entering the main vacuum chamber 3, the glass plates are arranged separately, the vacuum degree on the periphery of the glass plates is as same as the vacuum degree in the main vacuum chamber 3, and the vacuum degree between the combined glass plates is as same as the vacuum degree in the main vacuum chamber 3, so the vacuum glass member with high vacuum degree can be manufactured. For example, when the vacuum degree of in the main vacuum chamber 3 is $1\sim5\times10^{-3}$ Pa, the vacuum degree of the processed vacuum glass member can reach $1\text{-}3\times10^{-2}$ Pa, and the vacuum degree further exceeds the vacuum degree standard requirement of the conventional vacuum glass member.

According to the continuous vacuum glass member processing device disclosed in the present invention, the auxiliary vacuum chambers (the front-end auxiliary vacuum chambers comprise the inlet buffer chamber 1 and the vacuum pre-extracting chamber 2, and the back-end auxiliary vacuum chambers comprise the inflating transition chamber 4 and the outlet buffer chamber 5) are arranged at the front and rear ends of the main vacuum chamber; during working, the chambers are arranged continuously, step-shaped vacuum distribution is formed at the two ends of the main vacuum chamber to isolate the main vacuum chamber and the external atmosphere; and compared with the structural form only provided with the main vacuum chamber, the running energy consumption is greatly reduced, the streamline production of the vacuum glass member can be realized, the production efficiency is improved, and the production cost is saved.

In the present invention, the glass plates are conveyed respectively before being combined, the two glass plates have certain spacing distance, the distance should ensure that the vacuum degrees on the surfaces of the two glass plates are as same as that in the vacuum chambers, and the distance is preferably not less than 5 millimeters when the glass plates are arranged in parallel. The setting mode can ensure that the vacuum degree on the periphery of the glass plates before combining is basically as same as that in the main vacuum chamber, so the conditions of long evacuating time and incompleteness caused by small slit between the combined glass plates are avoided.

Heating equipment can also be arranged in the two auxiliary vacuum chambers at the front end of the main vacuum chamber, and the glass plates are preheated before entering the main vacuum chamber, so that glass surface exhaust and subsequent sealing processes can be smoothly performed. No heating equipment are arranged in the two auxiliary vacuum chambers at the rear end of the main vacuum chamber, so that the sealed vacuum glass member is gradually cooled in the two chambers to realize better working performance.

The invention claimed is:

1. A continuous vacuum glass member processing device comprising:
    a loading table, front-end auxiliary vacuum chambers, a main vacuum chamber, back-end auxiliary vacuum chambers and an unloading table sequentially along an advancing direction of a glass;
    wherein the device also comprises a glass plate conveying device and an electric control system;
    wherein glass plates on the loading table are sequentially conveyed to the front-end auxiliary vacuum chambers, the main vacuum chamber, the back-end auxiliary vacuum chambers and the unloading table through the glass plate conveying device;
    wherein the electric control system is used for controlling a vacuum sealing process and an equipment operation flow;
    wherein the front-end auxiliarry vacuum chambers, the main chamber and the back-end auxiliary vacuum chambers are independent from one another and are provided with a vacuum obtaining system and a vacuum detection device, respectively;
    wherein vacuum degrees of the front-end auxiliary vacuum chambers and the back-end auxiliary vacuum chambers are equal to or lower than a vacuum degree of the main vacuum chamber, and wherein the front-end and back-end auxiliary vacuum chambers provide a transition vacuum space at front and rear ends of the main vacuum chamber, respectively;
    wherein a plate combining device and a sealing device are arranged in the main vacuum chamber, and wherein the plate combining device and the sealing device provided for plate combining operations and sealing operations on a periphely of glass plates in the main vacuum chamber, and wherein input and output ends of the plate combining device are connected with glass plate conveying devices positioned upstream and downstream, respectively; and
    wherein both the front-end auxiliary vacuum chambers and the back-end auxiliary vacuum chambers have a modularized structure, wherein front and rear ends of the main vacuum chamber are provided with one or more front-end auxiliary vacuum chambers and one or more back-end auxiliar vacuum chambers, respectively, and wherein the vacuum degrees of the front-end auxiliary vacuum chambers are gradually improved as close to the main vacuum chamber, and the vacuum degrees of the back-end auxiliary vacuum chambers are gradually reduced as away the main vacuum chamber.

2. The continuous vacuum glass member processing device according to the claim 1, wherein along the advancing direction of the glass plates, each vacuum chamber is airtightly isolated with a connected upstream station and downstream station through an openable isolation door.

3. The continuous vacuum glass member processing device according to the claim 1, wherein the processing device also comprises cleaning equipment, and the cleaning equipment is arranged in one of the front-end auxiliary vacuum chambers.

4. The continuous vacuum glass member processing device according to the claim 1, wherein the plate combining device comprises at least two glass plate conveying mechanisms, and the plate combining device automatically assembles the glass plates conveyed by the at least two glass plate conveying mechanisms together in a mode that the glass plate conveyed by one glass plate conveying mechanism is automatically stacked on the glass plate conveyed by the other glass plate conveying mechanism.

5. The continuous vacuum glass member processing device according to the claim 4, wherein the glass plate conveying mechanism is a roller table conveying mechanism or a belt type conveying mechanism, wherein the roller table conveying mechanism comprises a plurality of glass plate conveying rollers parallel to one another and arranged at intervals, and the belt type conveying mechanism comprises a supporting roller and a conveyor belt wound on the supporting roller.

6. The continuous vacuum glass member processing device according to the claim 5, wherein the glass plate conveying mechanisms are mutually arranged up and down at intervals, wherein glass plate conveying directions of the glass plate conveying mechanisms are consistent with each other, wherein the glass plates conveyed by each upper conveying mechanism are finally stacked on a bottom conveying mechanism, and the glass plates are automatically and mutually assembled together.

7. The continuous vacuum a glass member processing device according to the claim 6, wherein the glass plates conveyed by the each upper conveying mechanism are stacked on the bottom conveying mechanism in an order, namely the order from top to bottom, wherein the glass plate conveyed by the conveying mechanism of a first layer is stacked on the glass plate conveyed by the conveying mechanism of a second layer, wherein the stacked together glass plates are subsequently stacked, from the conveying mechanism of the second layer, on the glass plate conveyed by the conveying mechanism of a third layer, and the processes are repeated till all the glass plates are stacked on the bottom conveying mechanism.

8. The continuous vacuum glass member processing device according to the claim 6, wherein the glass plates conveyed by the each upper conveying mechanism are stacked on the bottom conveying mechanism in an order, namely the order from bottom to top, firstly, the glass plate conveyed by the conveying mechanism of a second layer is stacked on the bottom (first layer) conveying mechanism or glass plate conveyed by the bottom (first layer) conveying mechanism, then the glass plate conveyed by the conveying mechanism of a third layer is stacked on the glass plate previously stacked on the bottom (the first layer) conveying mechanism, and the processes are repeated till all the glass plates conveyed by the conveying mechanisms are stacked on the bottom (the first layer) conveying mechanism.

9. The continuous vacuum glass member processing device according to the claim 6, wherein the glass plate conveying mechanisms, the glass plates conveyed by the conveying mechanisms above the bottom conveying mechanism simultaneously are stacked on the bottom conveying mechanism or the glass plate conveyed by the bottom conveying mechanism in a state of keeping the relationship of the upper and lower plates unchanged, and the glass plates are mutually assembled together.

10. The continuous vacuum glass member processing device according to claim 6, wherein in the glass plate conveying mechanisms, a glass plate conveying surface at the tail part of the conveying mechanism for conveying the glass plate to the other conveying mechanism is arranged obliquely, and is gradually close to the glass plate conveying surface on the conveying mechanism for bearing the conveyed glass plate along the advancing direction of the glass plate.

11. The continuous vacuum glass member processing device according to the claim 10, wherein the glass plate conveying mechanism is also provided with a glass plate guiding device, and the glass plate guiding device limits the position of the glass plate conveyed by the conveying mechanism in a direction vertical to the advancing direction of the glass plate.

12. The continuous vacuum glass member processing device according to the claim 10, wherein in the glass plate conveying mechanisms, the conveying mechanism for receiving the glass plate conveyed by the other conveying mechanism is also provided with a glass plate positioning device or adjusting device, wherein transverse position and longitudinal position of the glass plate are limited through the glass plate positioning device, or the transverse position and the longitudinal position of the glass plate are adjusted through the adjusting device, so that mutual assembly precision of the glass plates are ensured.

13. The continuous vacuum glass member processing device according to the claim 1, wherein the plate combining device comprises a trolley with a supporting device and a supporting roller table, wherein the trolley is movably arranged on the supporting roller table, wherein a lower glass plate in the vacuum glass member is placed on a bottom plate of the trolley, an upper glass plate is arranged above the lower glass plate through the supporting device, the upper and lower glass plates are mutually parallel without contact in any form, or one end of the upper glass plate is supported on the same side end of the lower glass plate and locally contacted with the lower glass plate, and the upper and lower glass plates have enough spacing distance or enough included angle, so that the vacuum degree around the upper and lower glass plates is same as the vacuum degree of the main vacuum chamber; and wherein for plate combination needed the upper glass plate is placed on the lower glass plate through the supporting device so as to complete combining operation.

14. The continuous vacuum glass member processing device according to the claim 1, wherein the plate combining device comprises a trolley with a supporting device and a supporting roller table, the trolley is movably arranged on the supporting roller table, each glass plate in the vacuum glass member is arranged on the trolley in a standing mode, the middle part or the end part of each glass plate leans on the supporting device, the adjacent glass plates are mutually parallel or locally contacted, and the adjacent glass plates have enough spacing distance or enough included angle, so that the vacuum degree around the glass plates is same as the vacuum degree of the main vacuum chamber; and combining operation of each plate is realized by operating the supporting device leaned by each glass plate.

15. The continuous vacuum glass member processing device according to the claim 1, wherein the sealing device comprises an inductive heating head, and the inductive heating head is moved through an operating mechanism to complete sealing operation of the vacuum glass member.

16. The continuous vacuum glass member processing device according to the claim 1, wherein a slit type vacuum glass sealing device is provided with a slit through which the glass member to be sealed passes, an inductive heating coil is arranged around the slit, and sealing is completed by passing the glass member to be sealed through the slit; and a compaction roller or a compaction wheel is arranged in the slit, and the glass member to be sealed passes through the slit in a mutual compaction state by using the compaction roller or the compaction wheel to ensure that the glass member to be sealed is reliably sealed.

17. The continuous vacuum glass member processing device according to the claim 1, wherein the sealing device comprises a laser heating device arranged on an exterior shell of the main vacuum chamber, the exterior shell of the main vacuum chamber is provided with a transparent window, and the laser heating device is configured to seals the plate combining assembled glass member in the main vacuum chamber through the transparent window.

* * * * *